United States Patent Office 2,823,124
Patented Feb. 11, 1958

2,823,124

PROCESS FOR PREPARATION OF CHOCOLATE EXTRACT OR CHOCOLATE SYRUP FROM COCOA

Folke Heden, Vineland, N. J., assignor to Limpert Bros., Inc., Vineland, N. J., a corporation of New York No Drawing. Application February 14, 1955
Serial No. 488,131

8 Claims. (Cl. 99—26)

The present invention relates to a process for the preparation of chocolate extract or chocolate syrup from cocoa.

Chocolate and cocoa (sometimes also termed "cacao") are obtained from the fruit of trees of the *Theobroma Cacao* species. The fruit is gourdlike and contains the seeds or beans which are freed from the adhering fruit pulp and sun-dried. The beans are roasted to develop the characteristic cocoa or chocolate flavor and are then crushed, after which the shells are separated from the crushed cotyledons or nibs. Chocolate consists of ground cocoa nibs. Cocoa is chocolate from which a portion of the fat (cocoa butter) has been removed, generally with the aid of heat and pressure. In preparing cocoa beverage, it is desirable to produce as perfect an emulsion as possible. The more common means of attempting to accomplish this is to pulverize the cocoa finely so that on boiling the particles remain in suspension in the paste formed by the gelatinization of the starch. The means resorted to in producing so-called Dutch process cocoa is the addition of water soluble alkali during the manufacture of the cocoa. Cocoa thus treated is darker but no more soluble than the ordinary product. Opinion is divided as to the relative excellence of the ordinary product and Dutch process cocoa.

Prior art methods of preparing the so-called essence of extract of chocolate have involved solvent extraction of the cocoa. Essence or extract thus produced has certain inherent disadvantages in that, for certain uses, such for example as a flavoring material for milk or soft drinks or the like, emulsification is necessary in order to produce dispersibility. In an effort to obviate this disadvantage, it has been suggested to effect the extraction with certain edible compounds which are adapted to aid in extracting the desired flavor or essence constituents from the cocoa-bearing material, by a process which involves thermally brewing nibs until they swell and then extracting the said constituents therefrom, after which the resulting chocolate extract solution, substantially free of cocoa butter, is separated from the nibs.

It is a primary object of the present invention to embody a process for the preparation of a homogeneous chocolate essence or extract in water solution, which is readily miscible in liquid mediums, such as milk and carbonated soft drinks, and which does not settle out from such mediums, even on long standing, which process is a non-thermal process, whereby any loss of the volatile flavor constituents of the cocoa being treated—such as inevitably occurs in a thermal treatment—is avoided, so that the resultant essence or extract is a rich full-bodied chocolate extract containing a maximum of the originally present flavoring matters.

Briefly stated, this object is realized according to the present invention by employing cocoa—i. e. partly defatted chocolate—as the starting material and subjecting the latter to non-thermal extraction with calcium hydroxide, the extraction phase of the process being carried out at room temperature (e. g. at about 20–30° C.).

In broad outline, the procedure according to the present invention involves stirring an aqueous slurry of cocoa—and, in this connection, any of the commercially available cocoa preparations may be employed—in the presence of calcium hydroxide until the desired extraction is realized, then filtering the slurry, allowing the filtrate to mature or ripen, eliminating any dissolved $Ca(OH)_2$ from the matured liquid extract and adjusting the pH thereof to the desired point, and finally again filtering to clarify the thus-treated extract.

As already indicated, it is a feature of the invention that the extraction-proper is carried out without addition of heat; if desired, the final filtering step may be carried out at slightly elevated temperature, since this may assist in clarification of the product. It is another feature of the process according to the invention that through to the filtrate side of the filter press wherein the first filtration—that of the agitated slurry—is carried out, all air is excluded from contact with the material being manipulated; in fact, these stages of the process are preferably carried out in an inert gas atmosphere, as for example in nitrogen gas under pressure. Once the slurry has been filtered, however, it is no longer necessary to exclude air and, in fact, it appears to be advantageous to process the filtrate—as, for instance, during the maturing thereof—in the open atmosphere, i. e. in free contact with the air.

The final filtrate constitutes the chocolate extract of the invention. Due to the ready miscibility of the extract of the invention, which is essentially a water solution, no difficulties due to settling out are encountered. By incorporating cane sugar into the extract, the latter may be converted into so-called chocolate syrup, may be used as such for flavoring milk, carbonate soft drinks, frostings such as cake icing, "snowballs," etc.

The invention is further explained by the following detailed description of a presently-preferred embodiment thereof:

An aqueous slurry is prepared by stirring about 8 to 10 pounds of cocoa into sufficient water at ordinary temperature (about 20–30° C.) to make a four and one-half gallon batch.

Thereupon, at the aforesaid temperature, an aqueous suspension of calcium hydroxide is stirred into the obtained aqueous slurry. From one up to about six percent by weight, relative to the weight of the cocoa, of dry calcium hydroxide is used. Prior to incorporation of the calcium hydroxide into the aqueous slurry of cocoa, the dry material is stirred up in a small quantity of water to form an aqueous suspension. It is preferred to employ about five percent of calcium hydroxide, relative to the weight of the cocoa, since optimum filtering properties are thus realized.

The so-prepared extraction mixture is then vigorously stirred in a closed receptacle for a period as long as from three to five hours, at the aforesaid ordinary temperature. This stirring is carried out in the absence of air; actually it is preferred that the previous steps of forming the slurry and incorporating the calcium hydroxide thereinto also be effected in the absence of air. To this end, it is desirable to carry out the stirring in an inert atmosphere; for this purpose, it is convenient to employ nitrogen or the like under a pressure slightly above atmospheric.

Upon completion of this vigorous stirring or extraction period, the slurry is at once filtered through a conventional filter press using up to about 200 pounds per square inch pressure, making sure here also that the slurry being filtered is kept out of contact with air. To this end, nitrogen pressure may be employed on the pressure side of the filter. The initial pressure applied to the slurry to be filtered may be as low as 20 pounds per square inch; it is preferred, however, that the pressure be finally increased to about 200 pounds per square inch in order to obtain a dry filter cake. The yield will be approximately three and one-quarter gallons of extract from a four and one-half gallon batch.

The filtrate from the filter press is collected in an open tank; from this point on, it is unnecessary, and possibly undesirable, to keep the product out of contact with the air.

The extraction has taken place in the presence of an excess of calcium hydroxide, since only about 0.16% by weight of the latter is soluble in water at about 25° C. This small amount of dissolved calcium hydroxide is entrained into the extract filtrate from the filter press. This entrained calcium hydroxide may advantageously be precipitated at this stage of the process, and this may be effected in a variety of ways. Thus, carbon dioxide may be introduced into the extract filtrate, whereupon the calcium is precipitated as calcium carbonate. Preferably, however, phosphoric acid ($H_3PO_4$) is added in sufficient quantity only to precipitate the calcium as calcium phosphate.

At this stage, the extract filtrate has a greenish appearance. Upon standing, still at ordinary temperature, conversion to chocolate color and, concomitantly, to chocolate taste takes place. This conversion can be accelerated, if desired, by agitating the mixture. Care must be taken during this conversion, during which the extract is in contact with the atmosphere, not to allow the same to proceed too far. Over-conversion e. g. by too much agitation will be indicated by the appearance of a yellow to brown coloration and by some foam formation. The preferred final pH—corresponding to generally optimum chocolate color and aroma—is between 6.65 and 6.9. If necessary, small quantities of dilute acetic, citric, tartaric or phosphoric acid may be added to adjust to this pH.

The precipitated calcium carbonate may be separated from the finished extract by decanting at room temperature, whereby the desired product is obtained by an entirely non-thermal process.

The removal of the precipitated calcium compound can, however, be enhanced by warming the extract—in no case should the temperature exceed 180° F. and, preferably, should be considerably below this magnitude—and filtering while warm.

The resultant extract can be bottled and sterilized as is, or it may be spray dried to produce a soluble powder, or it may be converted into syrup by the addition of cane sugar, in such quantity as is necessary to achieve the desired consistency. The product is then ready for use for flavoring milk or for flavoring carbonated drink or frozen confections, etc. The powder may be used in preparing cake icing and the like. The extract may of course be marketed as such, for subsequent conversion into syrup form or the like.

Having thus disclosed the invention and a preferred method of practicing the same, what is claimed is:

1. In a method of producing chocolate extract, the steps of extracting color and flavor values from cocoa by agitating an aqueous slurry of the cocoa in an inert atmosphere at a temperature of about 20–30° C. and in the presence of calcium hydroxide in the slurry being agitated, and separating the resultant aqueous extract containing the said color and flavor values from the cocoa residue.

2. A method of producing chocolate extract which comprises extracting color and flavor values from cocoa by agitating an aqueous slurry of said material in an inert atmosphere at a temperature of about 20–30° C. and in the presence of calcium hydroxide in the slurry being agitated, filtering the agitated slurry, and collecting the filtrate, the last-mentioned step being carried out in contact with air.

3. A method of producing chocolate extract which comprises extracting color and flavor values from cocoa by agitating an aqueous slurry of said material in an inert atmosphere at a temperature of about 20–30° C. and in the presence of calcium hydroxide in the slurry being agitated, filtering the agitated slurry, collecting the filtrate in contact with air, and eliminating entrained calcium values from such filtrate.

4. A method of producing chocolate extract which comprises extracting color and flavor values from cocoa by agitating an aqueous slurry of said material in an inert atmosphere at a temperature of about 20–30° C. and in the presence of calcium hydroxide in the slurry being agitated, filtering the agitated slurry in an inert atmosphere, collecting the filtrate in contact with air, eliminating entrained calcium values from such filtrate, and maturing the calcium-free filtrate to develop chocolate color, flavor and aroma by exposing the same to the air at said temperature.

5. A method according to claim 4, wherein the pH of the final extract is adjusted to 6.65 to 6.9.

6. A chocolate extract obtained by a method according to claim 1.

7. A chocolate syrup consisting essentially of a chocolate extract obtained by a method according to claim 1, and sugar.

8. In a method of producing chocolate extract from cocoa, which extract contains substantially the maximum of the color and flavor values of the said cocoa, the step which consists essentially of agitating an aqueous slurry of the cocoa in an inert atmosphere at a temperature of about 20–30° C. and in the presence of calcium hydroxide in the slurry in an amount of about 1% to about 6% by weight, relative to the weight of the cocoa followed by the step of separating the so-obtained aqueous extract containing the said values from the cocoa residue.

References Cited in the file of this patent

UNITED STATES PATENTS

| | | |
|---|---|---|
| 1,855,026 | Livingston et al. | Apr. 19, 1932 |
| 2,380,158 | Durrenmatt | July 10, 1945 |
| 2,512,663 | Masurovsky | June 27, 1950 |
| 2,515,794 | Palmer | July 18, 1950 |
| 2,687,959 | Siehrs | Aug. 31, 1954 |

FOREIGN PATENTS

| | | |
|---|---|---|
| 434,750 | Great Britain | Sept. 9, 1935 |